United States Patent [19]
Greenwood

[11] 3,856,662
[45] Dec. 24, 1974

[54] METHOD FOR SOLIDS-WITHDRAWAL AND TRANSPORT FROM A SUPERATMOSPHERIC PRESSURE SYSTEM

[75] Inventor: Arthur R. Greenwood, Niles, Ill.

[73] Assignee: Universal Oil Products Company, Des Plaines, Ill.

[22] Filed: Dec. 10, 1973

[21] Appl. No.: 423,605

Related U.S. Application Data

[62] Division of Ser. No. 347,583, April 2, 1973.

[52] U.S. Cl.................. 208/171, 208/150, 208/174
[51] Int. Cl............................................ C10g 13/16
[58] Field of Search ....... 208/171, 174, 150; 302/53

[56] References Cited
UNITED STATES PATENTS

| | | | |
|---|---|---|---|
| 2,699,363 | 1/1955 | Weinrich | 302/17 |
| 2,705,216 | 3/1955 | Drew | 208/174 |
| 2,756,193 | 7/1956 | Bergstrom | 208/174 |
| 3,785,963 | 1/1974 | Boyd et al | 208/171 |

Primary Examiner—Herbert Levine
Attorney, Agent, or Firm—James R. Hoatson, Jr.; Robert W. Erickson; William H. Page, II

[57] ABSTRACT

A solids-withdrawal and transport vessel, and method, for use in superatmospheric pressure systems containing a bed of solid particles which are movable through the system of gravity-flow. The vessel and method are especially adaptable to be utilized in a multitude of high-pressure systems for the catalytic conversion of hydrocarbonaceous material, in which systems the catalyst particles are at least periodically removed.

4 Claims, 4 Drawing Figures

Figure 1
Figure 2
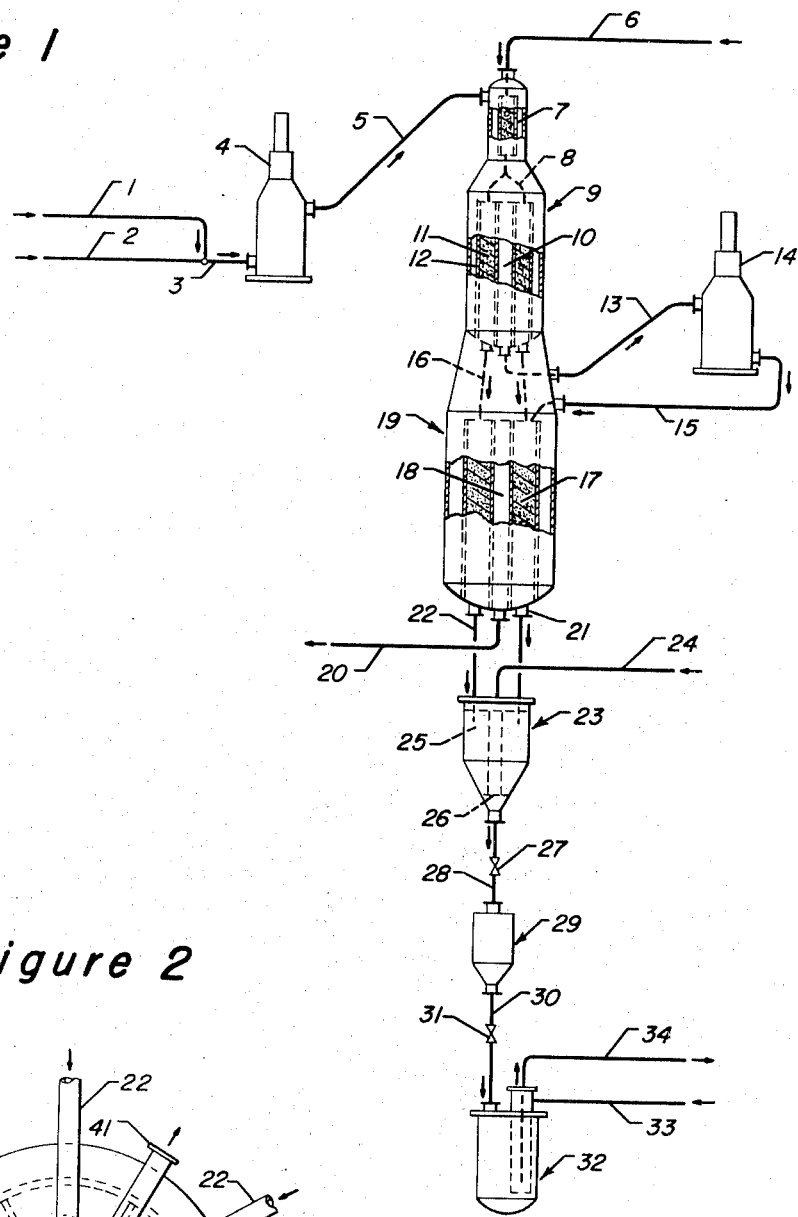
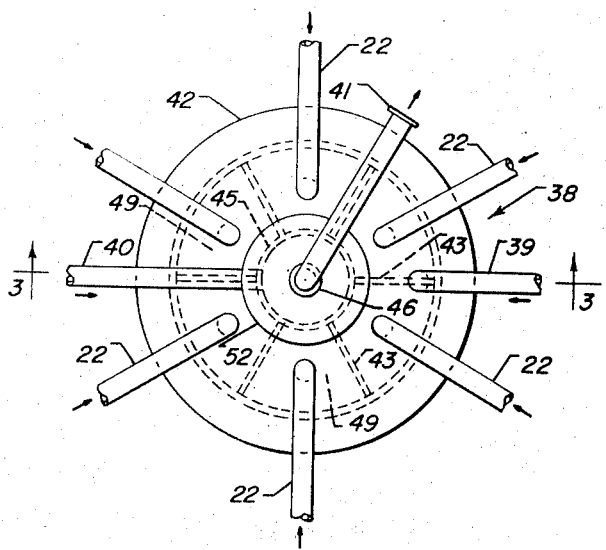

Figure 3
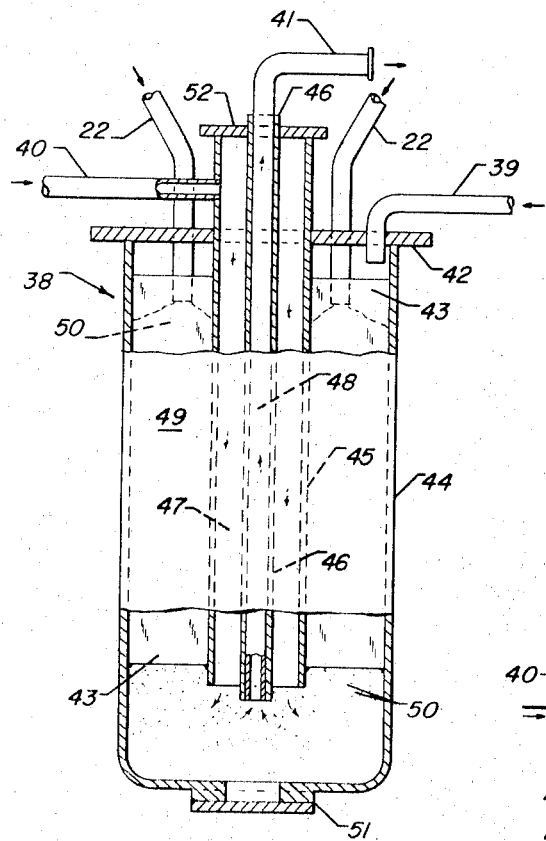
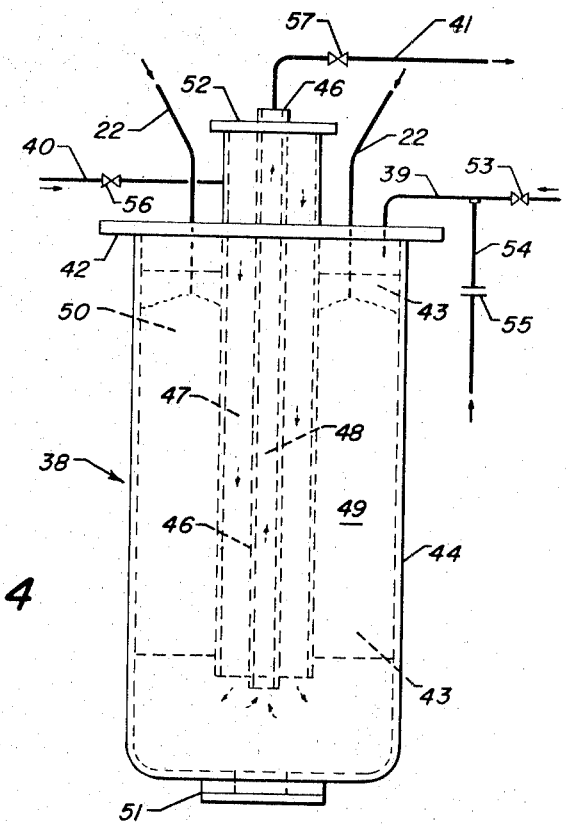
Figure 4

METHOD FOR SOLIDS-WITHDRAWAL AND TRANSPORT FROM A SUPERATMOSPHERIC PRESSURE SYSTEM

RELATED APPLICATION

This application is a Division of my copending application, Ser. No. 347,583, filed Apr. 2, 1973, all the teachings of which are incorporated herein by specific reference thereto. The present application is being filed to comply with a requirement for restriction in Ser. No. 347,583.

APPLICABILITY OF INVENTION

Movable beds of solids are currently employed in, or are applicable to a wide variety of systems. Such systems include, for example, heat-exchangers, filtration units, adsorption zones, catalytic conversion processes, etc. It is to such systems — i.e. those containing a bed of solids movable therethrough via gravity-flow — that the apparatus and method, encompassed by the present invention, is applicable.

More specifically, my invention is directed toward a system for the catalytic conversion of hydrocarbonaceous material. In particular, the inventive concept herein described is intended for utilization in a reaction system which provides contact of a reactant stream with catalyst particles movable through the system via gravity-flow, and especially where the reactant stream exists primarily in vapor phase, contact with the catalyst is effected in radial-flow and the system functions at superatmospheric pressure. In the interest of brevity, and not with the intent of unduly limiting the present invention, the following discussion will be specifically directed toward those systems wherein a downwardly moving bed of catalyst particles is employed in the conversion of a hydrocarbon reactant stream. In this regard, the solids-withdrawal and transport vessel of the present invention may be advantageously applied to (i) a single-stage reaction system; (ii) multiple-stage processes, wherein the reactant stream flows serially through two or more reaction chambers situated side by side; (iii) a combination process where the catalyst flows from the bottom of a stacked system to the top of an additional reactor in side-by-side relation with the stack; and, (iv) a multiple-stage, stacked reactor system. The novel vessel herein described affords a distinct improvement in the method of effecting withdrawal and transport of catalyst particles, downwardly moving in an annular-form section through which the fluid reactant stream flows laterally and radially.

A radial-flow reaction system generally consists of tubular-form sections, of varying nominal cross-sectional area, vertically and coaxially disposed to form the reaction vessel. Briefly, the system comprises a reaction chamber containing a coaxially disposed catalyst-retaining screen, having a nominal, internal cross-sectional area less than said chamber, and a perforated centerpipe having a nominal, internal cross-sectional area less than the catalyst-retaining screen. The reactant stream is introduced, preferably in vapor phase, into the annular-form space created between the inside wall of the chamber and the outside surface of the catalyst-retaining screen. The latter forms an annular-form catalyst-holding zone with the outside surface of the perforated centerpipe; vaporous reactant flows laterally and radially through the screen and catalyst zone into the centerpipe and out of the reaction chamber. Judicious design and operating considerations obviously require that the openings both in the centerpipe and the catalyst-retaining screen be sized to restrict the passage therethrough of catalyst particles. Although the tubular-form configuration of the various reactor components may take any suitable shape — i.e. triangular, square, oblong, diamond, etc. — many design, fabrication and technical considerations indicate the advantages of using components which are substantially circular in cross-section.

Candor compels recognition of the fact that various typess of processes utilize multiple-stage reaction systems, either in side-by-side configuration, or in a vertically-disposed stack. Such systems, as applied to petroleum refining, have been employed in a wide variety of hydrocarbon conversion systems, including catalytic reforming, fixed-bed alkylation, hydrorefining, hydrocracking, dehydrogenation, hydrogenation, steam reforming, etc. Many of these processes, such as dehydrogenation, desulfurization, etc., have traditionally employed a single fixed-bed catalytic reaction system. While my inventive concept is applicable to all the foregoing processes, the same will be further described in conjunction with the well-known catalytic reforming process. It is understood, however, that the solidswithdrawal and transport vessel affords a distinct improvement in other hydrocarbon conversion processes where characterized by a moving bed of gravity-flowing catalyst particles.

Historically, the catalytic reforming process utilized a catalytic composite of a Group VIII noble metal component combined with a refractory inorganic oxide, and was effected in a non-regenerative, fixed-bed system consisting of a plurality of reaction zones in side-by-side relation. When the catalytic composite had become deactivated to the extent that continuous operation was no longer economically feasible, the entire unit was shut down, and the catalyst regenerated in situ. After several such regenerations, the catalyst was replaced with fresh catalyst, and the deactivated catalyst subjected either to an exotic reconditioning technique, or to an involved method for the recovery of the precious noble metal. Of more recent vintage is the so-called "swing-bed" system in which an extra reactor is substituted for one which is due to be placed off-stream for regeneration purposes. This type of system gained wide acceptance, notwithstanding the required increase in catalyst inventory, in view of the fact that the entire unit was not caused to be shut down except for major operational upsets, or periodic turn-arounds for maintenance purposes. However, the swing-bed system possesses the inherent disadvantage accompanying the sudden replacement of an entire zone of deactivated catalyst with freshly regenerated catalyst; the result being operational upsets with respect to steady, lined-out conditions, as well as product yields and quality.

Still more recently, a "stacked" reactor system has been provided in which the catalyst particles flow, via gravity, downwardly from one annular-form catalyst zone to another. Ultimately, the catalyst is transferred to a suitable regeneration system, preferably also functioning with the downwardly moving bed of catalyst. In effect, the catalyst particles are maintained within the reaction system, and transferred from one section to another in a manner such that the flow of particles is continuous at frequent intervals, or at extended intervals, with the movement being controlled by the quantity of catalyst withdrawn from the last of the series of individual zones.

Illustrative of a reaction system, wherein the reactant stream is caused to flow laterally and radially through the catalyst, is that described in U.S. Pat. No. 2,683,654 (Class 23-388). The type of reactor shown is intended for the common fixed-bed system wherein the catalyst is either subjected to in situ regeneration, or replaced. The reactant stream flows from an outer annular-form space through a catalyst-retaining screen and catalyst particles disposed in another annular space, and into a perforated centerpipe, through the bottom of which it emanates from the reaction chamber.

U.S. Pat. No. 3,470,090 (Class 208-138) illustrates a side-by-side reaction system with intermediate heating of the reactant stream. Catalyst withdrawn from an individual reaction zone is sent to suitable regeneration facilities. This particular type of system can be modified such that the catalyst withdrawn from a given reaction zone is sent to the next succeeding reaction zone, while that catalyst withdrawn from the last reaction zone is transported to a suitable regeneration facility.

The stacked catalytic reforming configuration is shown in U.S. Pat. No. 3,647,680 (Class 208-65) as a two-stage system with an integrated regeneration system which receives the catalyst withdrawn from the bottom reaction chamber. The two latter techniques utilize a downwardly-moving bed of catalyst particles through which the reactant stream flows laterally and radially. Significant improvements are achieved, with these types of movable catalyst systems through the incorporation therein of the catalyst-withdrawal and transport vessel and method of the present invention. These improvements are hereinafter delineated while comparing the current moving-bed process with that resulting through the integration therein of the present invention.

OBJECTS AND EMBODIMENTS

A principal object of my invention is to provide an improved method for effecting the withdrawal of solids from a system in which the solids are movable by gravity-flow, while also effecting the transport of the withdrawn solids from the system. A corollary objective involves the design and construction of a vessel for effecting the withdrawal and transport of solids from a superatmospheric pressure system containing the same.

Another object of my invention resides in improving the technique of withdrawing catalyst particles from a hydrocarbon conversion system. A specific object involves providing a solids-withdrawal and transport vessel for utilization in a multiple-stage catalytic hydrocarbon conversion process.

Therefore, in a system having a bed of solids movable therethrough by gravity-flow, which solids are withdrawn from said system for removal therefrom, my invention encompasses the solids-withdrawal and transport vessel which comprises in combination: (a) a tubular-form, elongated chamber containing a plurality of solids inlet ports in the upper end thereof; (b) a first tubular-form centerpipe (i) attached to the upper end of said chamber and terminating a finite distance above the bottom end of said chamber, and (ii) having a nominal cross-sectional area less than said chamber, thereby providing a solidscollecting first annulus with said chamber; (c) a plurality of vertically-disposed baffles, within said first annulus, (i) attached to said chamber and said first centerpipe, and (ii) terminating short of both the upper and lower ends of said chamber, thereby providing a plurality of vertical solids-holding sections of substantially equal volume, and equal in number to said ports; (d) a plurality of solids inlet conduits through said inlet ports extending a finite distance into each of said solids-holding sections, and terminating below the top edge of said baffles; (e) a second tubular-form centerpipe (i) attached at its upper end to said first centerpipe and terminating a finite distance above the bottom of said chamber, and (ii) having a nominal cross-sectional area less than said first centerpipe, thereby providing a solids-transfer space and a second annulus with said first centerpipe; (f) a solids-transport medium conduit in open communication with the upper end of said second annulus; and, (g) a solids-purge medium conduit in open communication with the upper end of said chamber.

In another embodiment, the solids-withdrawal and transport vessel is further characterized in that the chamber, and the first and second centerpipes are substantially circular in cross-section. In a specific embodiment, the first and second centerpipes are imperforate.

Still another embodiment of my invention is directed toward a method for withdrawing and transporting a relatively uniform quantity of hydrocarbon conversion catalyst particles, substantially free from hydrocarbons, from a reaction zone containing a bed of said particles movable therethrough by gravity-flow, which method comprises the steps of: (a) withdrawing catalyst particles from said zone, through a plurality of conduits (i) in open communication with said bed, and (ii) substantially equally spaced throughout the cross-sectional area thereof; (b) introducing said catalyst particles, via said conduits, into an upper portion of a withdrawal and transport vessel having a plurality of vertical, peripheral catalyst-holding sections (i) of substantially equal volume, and (ii) equal in number to said conduits, one conduit discharging catalyst particles into one of said sections; (c) simultaneously and continuously introducing a first fluid purge stream into said vessel, and flowing said purge stream counter-currently through said conduits, at a linear velocity below that which effects fluidization of said catalyst particles, to strip hydrocarbons therefrom, while permitting free gravity-flow of the particles through said conduits; (d) when the quantity of catalyst particles in each catalyst-holding section contacts the lower extremity of each conduit, automatically terminating the flow of particles into each section, indroducing a second fluid lift stream downwardly into an annulus formed by imperforate, concentric first and second centerpipes, at a velocity sufficient to lift said catalyst particles from the bottom of said vessel upwardly through the inner concentric centerpipe, and removing said catalyst particles and fluid lift stream from said vessel; and, (e) simultaneously with the introduction of said fluid lift stream, and the removal of said particles, increasing the velocity of said fluid purge stream to a level inhibiting the flow of catalyst particles downwardly through said conduits, said increased level being below that effecting a reversal of catalyst flow within said conduits.

These, as well as the other objects and embodiments, will become evident from the following, more detailed description of the solids-withdrawal and transport vessel and the method of catalyst withdrawal utilizing the same.

SUMMARY OF INVENTION

As hereinbefore set forth, the vessel of the present invention is suitable for use in a multitude of hydrocarbon conversion processes, and especially those which are effected in vapor phase. Although the following discussion is primarily directed toward the catalytic reforming of naphtha fractions, and/or distillates, there is no intent to so limit the present invention. Catalytic reforming, as well as the other processes previously set forth, has gone through several development phases which have currently terminated in a catalytic reactor system in which the catalyst particles are in the form of a descending column in one or more reaction vessels. Typically, the catalytic composite is utilized in a substantially spherical form having a nominal diameter ranging from about one-thirtysecond-inch to about ⅛-inch in order to afford free-flow characteristics which will not bridge, or block the descending column, or columns of catalyst within the overall system. In one such multiple system, the multiple reaction chambers are vertically stacked, and a plurality of relatively small diameter transfer conduits are employed to transfer catalyst particles from one reaction zone to another. In order to facilitate and enhance gravity-flow of the particles from one zone to another, it is particularly important that the catalyst particles have a small diameter and one which is preferably less than about one-eighth-inch.

With respect to the catalytic reforming of hydrocarbons, in a vapor-phase operation, conditions include catalyst temperatures in the range of about 700°F. to about 1,000°F.; cautious techniques generally dictate that catalyst temperatures not substantially exceed a level of about 1,020°F. Other conditions include a pressure from about 50 psig. to about 1,000 psig., a liquid hourly space velocity of from 0.2 to about 10.0 and a hydrogen to hydrocarbon mole ratio from about 1.0:1.0 to about 10.0:1.0. The present inventive concept is particularly adaptable for a low-pressure operation — i.e. from about 50 psig. to about 200 psig. In view of the fact that catalytic reforming reactions are principally endothermic in nature, the multiple-stage system will employ interstage heating of the effluent from a preceding zone, prior to the introduction thereof into the next succeeding zone. Catalytic reforming reactions are effected through the utilization of a Group VIII noble metal combined with a halogen component and a suitable porous carrier material; with respect to the latter, alumina is generally preferred. Recent investigations have shown that more advantageous results are enjoyed through the cojoint use of a catalytic metallic modifier; these are generally selected from the group of rhenium, germanium, tin, titanium, vanadium, and various mixtures thereof.

As previously stated, the solids-withdrawal and transport vessel herein described affords advantages when utilized in conjunction with either a side-by-side, multiple-stage reaction system, a stacked, multiple-stage system, or a single-stage reaction system. With respect to the side-by-side system, the present vessel effects the removal of catalyst particles from the bottom of one reactor and transports them to the top of a succeeding reactor; also, in such a system, the vessel will transport those catalyst particles withdrawn from the last reaction zone to the regeneration facilities, as well as transport regenerated catalyst to the top of the first reactor. Likewise, in a stacked system, the vessel will withdraw catalyst particles from the bottom reaction zone, transport them to the regeneration section, and introduce regenerated catalyst to the top of the stacked stages. Currently-practiced techniques, for withdrawing catalyst particles and substantially transporting them, require the use of three vessels. Initially, the particles flow into a so-called catalyst collector, from which they are transferred to a valve-blocked lock hopper. That is, the upstream and downstream conduits, into and out of the lock hopper, are valved such that the hopper can be locked out of the system. The upstream valve is opened (the downstream valve being closed) to permit catalyst particles to flow into the lock hopper from the catalyst collector. The upstream valve is closed when the catalyst collector is emptied, the downstream valve is opened, and the catalyst particles flow from the lock hopper into a lift engager; the downstream valve is then closed, thereby effectively blocking-in the lock hopper. The catalyst is then entrained in a fluid lift medium and transferred either to the top of another reactor vessel, or to the top of a regeneration system. In some of the processes hereinbefore described, the nature of the charge stock requires liquid-phase operation. With this situation, the fluid lift and purge media may be liquid — i.e. a low molecular weight hydrocarbon. Where the conversion reaction is effected in a vapor-phase operation, the media will generally be gaseous in nature. The remainder of this discussion will be limited to gaseous media in the interest of simplicity and brevity. The above-described technique for catalyst-withdrawal and transport will be hereinafter described in greater detail with reference to accompanying FIGURE 1.

Although the three-vessel technique, for catalyst-withdrawal has been proven successful, in actual operation, there are several drawbacks which are overcome through the utilization of the present invention. Since the system is centered around a bed of catalyst particles which are movable through the system via gravity-flow, operating considerations dictate that the design provide substantially uninhibited vertical flow; that is, a minimal amount of direction changes. In other words, the entire system preferably has a common vertical axis. This requires that a considerable distance be provided between the bottom of the reaction chamber and grade level — in general, this distance is approximately 35 feet in order to accommodate the three withdrawal and transport vessels. The utilization of the present invention, as a result of which the 35 foot requirement is reduced to approximately 10 feet, effectively combines two of these previously-required vessels into a single vessel. An immediate advantage arises with respect ot existing side-by-side, fixed-bed units which are already designed to provide the 10-foot distance (for facilitating catalyst replacement). Such systems can now be revamped to a continuous catalyst withdrawal system without the necessity of elevating the reaction zones. Also, the design and construction of new units are economically enhanced as a result of the elimination of both the height requirement and the two vessels. Whenever there exists a substantial pressure change, the lock hopper will still be required. Thus, when the present lift-engager is employed in a side-by-side system between reactors, the lock hopper can be eliminated. However, in transporting the catalyst from the last reactor to the regenerator, the lock hopper will be required as a result of the pressure change and for purging; it will, in this situation, be located above the regenerator.

The construction and operation of the solids-withdrawal and transport vessel, encompassed by my invention, will become more evident through reference to the accompanying drawings. These are directed to a multiple-stage system for the catalytic conversion of a hydrocarbonaceous reactant stream, with the reaction chambers in stacked configuration. As an illustration, therefore, it is not intended that the present invention be so limited; the scope of the present concept is applicable to the removal and transport of solids from any movable-bed system.

DESCRIPTION OF DRAWINGS

Briefly, the accompanying drawings are as follows:

FIG. 1 is a partially-sectioned elevation of a stacked reactor system consisting of two reaction stages, 9 and 19, from which the catalyst is withdrawn and transported through the use of catalyst collector 23, lock hopper 29 and lift engager 32.

FIG. 2 constitutes a plan view of the solidswithdrawal and transport vessel of the present invention.

FIG. 3 is a partially-sectioned elevation of the vessel taken approximately along the line 3—3 of FIG. 2.

FIG. 4 is an elevational view of the vessel, and incorporates, schematically, the lift line 41, the gaseous purge conduit 39 and the gaseous lift-medium conduit 40.

With reference now to FIG. 1, a two-stage, stacked system is presented, including a feed preheater 4 and a reactant stream interheater 14. In this illustration, the catalyst-withdrawal and transport system consists of catalyst collector 23, lock hopper 29 and lift engager 32. It should be noted that the various components, exclusive of heaters 4 and 14, are in vertical alignment; a plan view of this arrangement would further indicate that the various components are substantially circular and coaxially disposed. The charge stock, for example, a straight-run naphtha fraction boiling from about 200°F. to about 400°F is introduced into the process by way of line 1, and is commingled with a hydrogen-rich recycle gas stream entering via line 2.

Following suitable heat-exchange with various hot effluent streams not illustrated, the naphtha/hydrogen mixture passes through line 3 into heater 4 wherein the temperature thereof is increased to a level required to achieve the desired temperature at the inlet to the catalyst bed. The thus-heated mixture is passed via line 5 to a stacked catalytic reforming system comprising upper reactor 9 and lower reactor 19. Upper reactor 9 is shown as being in vertical alignment with reactor 19, having an intermediate heater 14 therebetween to resupply the heat lost as a result of the endothermicity of the reactions being effected. Situated above reactor 9 is a catalyst reduction section 7, wherein fresh or regenerated catalyst, supplied via line 6, is contacted with hydrogen and heat-exchanged indirectly with the heated naphtha/hydrogen mixture entering via line 5. Reforming reactors 9 and 19 contain an annular-form bed of catalyst particles containing about 0.375% by weight of platinum, 0.375% by weight of rhenium and about 0.9% by weight of combined chloride composited with a carrier materail of alumina. Each reactor is maintained at a temperature in the range of about 850°F. to about 1,000°F. and a pressure of about 200 psig. As illustrated, reforming reactor 9 contains an annular movable bed 11 formed by spaced cylindrical screens 12. The naphtha-hydrogen mixture is contacted with the catalyst in lateral, radial-flow fashion through the catalyst bed, with the reactant stream continuing downwardly and outwardly through cylindrical space 10. The resultant conversion product is withdrawn through conduit 13 and passed to interheater 14 wherein the same is reheated and introduced into reforming zone 19 by way of line 15.

Within reforming reactor 19, the reactant stream is again passed through the annular catalyst bed 17 in a lateral, radial-flow fashion in substantially the same manner as in reactor 9. The reactants in reforming reactor 19 are passed into cylindrical space 18, withdrawn via line 20 and passed thereby to conventional product separation facilities for recovery of a high-octane motor fuel product and a hydrogen-rich gaseous phase which is at least in part recycled by way of line 2.

With reference once again to the upper portion of the reaction system, catalyst particles introduced via line 6 pass through reducing zone 7, and are equally distributed throughout the annular moving bed 11 by a plurality of catalyst transfer conduits 8. Transfer conduits 8 are generally uniformly distributed across the cross-sectional area of annular bed 11, and number from about 6 to about 16. The catalyst particles in reactor 9 may be continuously or intermittently allowed to flow by gravity through reactor 9, being removed from the bottom portion thereof by a plurality of catalyst transfer conduits 16 being introduced thereby into annular bed 17 of reactor 19. Transfer conduits 16 possess a sufficiently small diameter which creates sufficient pressure drop such that essentially all of the naphtha/-hydrogen reactant mixture from reactor 9 is passed into interheater 14 via line 13. Very little, if any of the reactant mixture from reactor 9 by-passes interheater 14. In effect, the stacked reactor system comprising reactors 9 and 19 has a common catalyst bed moving as a substantially unbroken column of particles through the top of reactor 9 and the bottom of reactor 19. In a typical catalytic reforming operation, the catalyst is withdrawn from lower reactor 19 via transfer conduits 22 at a rate such that the catalyst inventory of the total system is replaced in an approximate 7 to 30-day cycle.

The catalyst particles are withdrawn from annular space 17, in reactor 19, through plurality of exit ports 21 and catalytic transfer conduits 22. As previously stated with respect to conduits 16, the exit ports 21 and conduits 22 are uniformly spaced throughout the cross-section of annular space 17, and number from about six to about sixteen. When the catalyst is withdrawn through conduits 22, into catalyst collector 23, valve 27 in line 28 is in a closed position. Catalyst collector 23 contains a plurality of vertical sections formed by a plurality of vertical baffles 25, each section being of relatively equal volume and equal in number to conduits 22. Conduits 22 connect withdrawal ports 21 and each of the vertical sections within collector 23, and each terminates a finite distance (about 0.5 to about 2.0 inches) below the upper edge of vertical baffles 25. Located in the lower portion of collector 23, is a non-baffled collection zone 26 which is in open communication with each of the vertical sections.

During the period when the catalyst is being withdrawn through conduits 22, it is contacted with a countercurrently flowing hydrogen stream being introduced via line 24. This hydrogen stream is relatively free from hydrocarbons, and enters the open area of the collector vessel to flow upward into conduits 22 at a velocity which permits the continuing flow of catalyst, but sufficient to render the catalyst particles substantially free from hydrocarbons. Generally, the catalyst which is withdrawn into collector 23 contains less than about 2.0% by weight of hydrocarbons.

The flow of catalyst through conduits 22 continues until the level of catalyst in each vertical section reaches the discharge end of the conduits. At this instant, the flow of catalyst is automatically terminated due to the flow characteristics and the angle of repose. Thus, the catalyst will not overflow from one vertical section into another, and the volume of catalyst withdrawn through each of the multiple conduits 22 is equal to the volume of each of the vertical sections formed by baffles 25. When the level of catalyst in each vertical section attains the level of the discharge end of the conduits 22, the rate of hydrogen introduction via line 24 is increased to a velocity sufficient to prevent additional catalyst flow through the conduits. In a typical operation, the counter-currently-flowing hydrogen is maintained at a rate about 25.0% the average mass flow rate of the catalyst being withdrawn. The velocity is subsequently increased to a level approximating twice the minimum fluidization velocity of the catalyst bed. This velocity is sufficient to maintain a terminated catalyst flow while catalyst collector 23 is emptied, but is below that which would cause the catalyst to back up through conduits 22.

During the period when the gaseous medium flow through conduit 24 is at the increased level, valve 27 in line 28 is opened, and the catalyst particles are passed from collector 23 into lock hopper 29, valve 31 in line 30 being closed. When collector 23 has been emptied, valve 27 is closed and valve 31 is opened, permitting the catalyst particles to flow into lift engager 32 at a reduced pressure. After lock hopper 29 has been emptied, valve 31 is closed. A gaseous lift medium — i.e. nitrogen, hydrogen, etc. — is introduced through line 33 at a rate sufficient to lift the catalyst particles out of lift engager 32 by way of lift line 34. The particles are transported therethrough to reconditioning, or regeneration facilities, neither of which is illustrated.

This description is exemplary of the currentlypracticed techniques for effecting a hydrocarbon conversion process utilizing lateral, radial flow of the reactant stream through an annular-form bed of catalyst particles movable therethrough via gravity-flow. It is further illustrative of the technique employed in effecting catalystwithdrawal and the transportation thereof from the reaction system. The present invention is intended for use in such a system, and affords numerous advantages respecting initial design and construction, as well as facilitating the withdrawal and transport of the catalyst particles. One such major advantage, stemming from the replacement of the three catalyst-collecting and transporting vessels with the single vessel of this invention, resides in the fact that present-day, fixed-bed systems, in side-by-side configuration, can now be revamped without the necessity of raising the bottoms of the reaction chambers to a height approximately 35 feet. In fact the greater majority of fixed-bed systems now in operation will not require the elevation to be increased at all.

The catalyst-withdrawal and transport vessel of my invention is illustrated in FIGS. 2 and 3, FIG. 2 being a plan view of the vessel, and FIG. 3 a partially sectioned view taken substantially along the line 3—3 of FIG. 2. Referring to FIG. 2, the present vessel is generally indicated as 38, having a plurality (in this case, six) of catalyst transfer conduits 22 entering vessel 38 through top plate 42 in uniform configuration, throughout its cross-sectional area. The main body 44, of vessel 38, is substantially circular, and is uniformly divided into six catalyst-holding sections 49 by means of baffles 43. Conduit 39 serves to introduce a gaseous purge medium into the main body of the vessel, at a locus above the vertical sections 49. Normally, the discharge end of purge conduit 39 is flush with the interior surface of cover plate 42. In most designs, the distance between the discharge end of conduit 39 and the vertical sections 49, will be about 2.0 inches. As shown in FIG. 3, the purge medium is introduced into the annular-form space created by centerpipe 45 and the interior wall of main body 44. Conduit 40 functions to introduce a gaseous lift medium into the annular-form space formed by centerpipes 45 and 46. The catalyst particles and lift gas medium exit the system by way of lift pipe 41.

FIG. 3 is, as above set forth, a partially-sectioned view of vessel 38 taken substantially along the line 3—3 of FIG. 2, and shows the integrated relationships of the various components. Vessel 38 is shown as consisting of a tubular-form, elongated chamber (or main body) 44 and a top, or cover plate 42 containing a plurality of inlet ports through which the catalyst inlet conduits 22 terminate in open communication with the interior of vessel 38. Chamber 44 contains an imperforate centerpipe 45 having a nominal, internal cross-sectional area less than chamber 44, to provide a solids-collecting first annulus with the chamber. Centerpipe 45 is attached to the upper end of chamber 44 at cover plate 42, and terminates a finite distance above the bottom end of the chamber. Generally, the distance between the lower end of centerpipe 46 and the bottom of chamber 44 approximates one pipe diameter, or slightly more. If too short, the system may plug; where too long, too much "heel" would be left after transfer from the vessel.

Uniformly disposed throughout the annulus created by chamber 44 and centerpipe 45, are a plurality of baffles 43, affixed to the outer surface of centerpipe 45 and the interior wall of chamber 44, which baffles are equal in number to the inlet ports and transfer conduits 22 therethrough. As indicated in FIG. 3, baffles 43 terminate a finite distance both below the upper end plate 42 and the bottom end of chamber 44. There is thus provided, at the upper end, an open annular-form area above the catalyst collecting sections 49, and, in the bottom of chamber 44, an unbaffled catalyst collecting area. It should be noted that a preferred construction, as shown, is one where centerpipe 45 extends down into chamber 44 to a point below (about 0.5 to about 2.0 inches) the lower edges of baffles 43. Further noted is the preference to have each of the conduits 22 terminate below (about 0.25 to about 2.0 inches) the upper edges of baffles 43. This insures a substantially uniform withdrawal of catalyst particles through conduits 22, as well as a substantially equal volume of catalyst in each vertical section 49, as the level of catalyst 50 attains the discharge end of conduits 22, automatically terminating catalyst flow. Furthermore, this prevents catalyst from spilling over into one vertical section 49 from another.

A second tubular-form centerpipe 46, preferably imperforate, having a nominal, internal cross-sectional area less than centerpipe 45, forms a second annulus 47 and a solids transfer space 48 whic leads into lift line 41. Both centerpipes 45 and 46 extend a finite distance above the cover plate 42, terminating in ring flange 52. Ring flange 52 serves both to seal the chamber and centerpipe 45, and to form the attachment between the latter and centerpipe 46. The lower terminal end of centerpipe 46, as shown, preferably terminates below (about 0.25 to about 2.0 inches) the lower end of centerpipe 45. This enhances the lifting action of the gaseous medium entering through the conduit 40, flowing downwardly through annulus 47 into the open area at the bottom of chamber 44 and upward through solids-transfer space 48, carrying, or lifting the catalyst particles into lift pipe 41 and thus out of the system. Centerpipe 45 is sized such that the vapor velocity downward in annulus 47 is substantially equal to the vapor velocity upward through centerpipe 46. The rate at which catalyst is lifted from vessel 38 into lift line 41, can be adjusted by changing the distance centerpipe 46 extends below centerpipe 45. Solids-transport, of lift medium conduit 40 is shown as being in open communication with the upper end of annulus 47, while the purge medium conduit 39 is in open communication with the open annular-form, unbaffled area above catalyst collecting sections 49. Ring flange 51 is a blind which serves to seal the bottom of chamber 44 and affords an access manway to the chamber internals.

In the illustration just described, catalyst flow through conduits 22 has ceased as a result of the level of catalyst 50 in sections 49 attaining the discharge end of conduits 22. This is the status of the solids-withdrawal and transport vessel shown schematically in FIG. 4. At this point, valve 56 in lift medium conduit 40 is closed, as is valve 47 in lift line 41. A gaseous purge medium, preferably hydrogen, is constantly flowing through line 39 into the open annular-form area above vertical sections 49. Since valve 53 is also closed, the constant purge is supplied by providing line 54 containing restriction orifice 55. The constant purge rate, through conduits 22, is maintained at a velocity at least 40.0% to about 40.0% of that required to effect fluidization of the catalyst particles. With valves 53, 56 and 57 is closed position, the purge stream must exit counter-currently through catalyst transfer conduits 22, thereby effectively stripping hydrocarbons from the catalyst.

At this point, valves 57 and 56 are opened and the gaseous lift medium introduced, via line 40 into annulus 47; the actual velocity will be sufficient to lift catalyst particles 50 through transfer space 48 and out of the system via lift line 41. Simultaneously with the introduction of the lift gas stream through line 40, valve 53 is opened to increase the velocity of the purge gas stream to a level which terminates the flow of catalyst particles through conduits 22 into chamber 44, but below that level which would result in a reverse flow of catalyst through the conduits. The flow of vapor through lift line 41 is controlled, by external means not illustrated, at a rate equal to the flow of lift gas controlled by valve 56 in line 40, such that all of the vapors entering through valve 53 and restriction orifice 55 must, of necessity, pass upward through transfer conduits 22.

When all of the withdrawn catalyst has been transferred from vertical sections 49, valves 56 and 57 are closed. Valve 53 is then closed, reducing the flow of vapor upwardly through conduits 22 to the original purge rate, thereby again allowing catalyst to flow through conduits 22 until vertical sections 49 are once again filled with catalyst.

The foregoing is believed to illustrate the solids-withdrawal and transport vessel of the present invention, as well as the method by which it is employed; many advantages, in addition to those previously mentioned, will become evident to those skilled in the art.

I claim as my invention:

1. A method for withdrawing and transporting a relatively uniform quantity of hydrocarbon conversion catalyst particles, substantially free from hydrocarbons, from a reaction zone containing a bed of said particles movable therethrough by gravity-flow, which method comprises the steps of:
   a. withdrawing catalyst particles from said zone, through a plurality of conduits (i) in open communication with said bed, and (ii) substantially equally spaced through-out the cross-sectional area thereof;
   b. introducing said catalyst particles, via said conduits, into an upper portion of a withdrawal and transport vessel having a plurality of vertical, peripheral catalyst-holding sections (i) of substantially equal volume, and (ii) equal in number to said conduits, one conduit discharging catalyst particles into one of said sections;
   c. simultaneously and continuously introducing a first fluid purge stream into said vessel, and flowing said purge stream countercurrently through said conduits, at a linear velocity below that which effects fluidization of said catalyst particles, to strip hydrocarbons therefrom, while permitting free gravity-flow of the particles through said conduits;
   d. when the quantity of catalyst particles in each catalyst-holding section contacts the lower extremity of each conduit, automatically terminating the flow of particles into each section, introducing a second fluid lift stream downwardly into an annulus formed by imperforate, concentric first and second centerpipes, at a velocity sufficient to lift said catalyst particles from the bottom of said vessel upwardly through the inner concentric centerpipe, and removing said catalyst particles and gaseous lift stream from said vessel;
   e. simultaneously with the introduction of said fluid lift stream, and the removal of said particles, increasing the velocity of said purge stream to a level inhibiting the flow of catalyst particles downwardly through said conduits, said increased level being below that causing a reversal of catalyst flow in said conduits; and,
   f. after said catalyst particles have been removed from said vessel, terminating the flow of said fluid lift stream and decreasing the velocity of said fluid purge stream to a level permitting the flow of catalyst particles through said conduits.

2. The method of claim 1 further characterized in that said purge and lift streams are gaseous.

3. The method of claim 1 further characterized in that the velocity of said constantly-flowing fluid purge stream is at least 40.0% to about 70.0% of that required to effect fluidization of the catalyst particles.

4. The method of claim 1 further characterized in that the increased velocity of said fluid purge stream is at least about two times the minimum fluidization velocity of the catalyst bed.

* * * * *